Sept. 21, 1965    C. W. RANSON    3,207,487
FRUIT AND VEGETABLE WASHING DEVICE
Filed Feb. 11, 1963

United States Patent Office 3,207,487
Patented Sept. 21, 1965

3,207,487
FRUIT AND VEGETABLE WASHING DEVICE
Charles W. Ranson, 7906 Agnew Ave., Los Angeles, Calif.
Filed Feb. 11, 1963, Ser. No. 257,413
8 Claims. (Cl. 259—36)

The present invention relates to a washing device for fruits, vegetables, and other solid food units. The device provides for imparting to contained liquid a two dimensional circulative flow in a vertical plane. Provision is included for the circulative liquid flow to receive sufficient kinetic energy from tangential inlet liquid flow to effect continuous vertical circulative motion of the fruits or vegetables.

Objects of the invention are to provide for the thorough cleaning of all surface areas of fruits and vegetables in minimum time and without bruises or damage.

Other objects are to provide a simple cleaning device having no moving mechanical parts, and which can be used conveniently in household kitchen sinks, and which can utilize kinetic energy available from conventional household faucet water.

An object is to provide a venturi-like effect at the zone of upward motion of food units to provide increased vertical fluid velocity locally and hence improved capability in lifting food units vertically against gravity forces for greater washing capacity.

Another object is to eliminate the low velocity core portion of a vortex-like liquid flow field and thereby provide more uniform washing action and a faster average washing time of food units.

Another object is to bleed low energy liquid flow from the main stream of circulative flow and thereby retard eddy formation and reduce kinetic energy losses and improve efficiency.

A number of other objects and advantages will become apparent as the description proceeds.

One form of the present invention is illustrated in the accompanying drawings wherein similar numerals refer to similar parts throughout the views.

Figure 2:
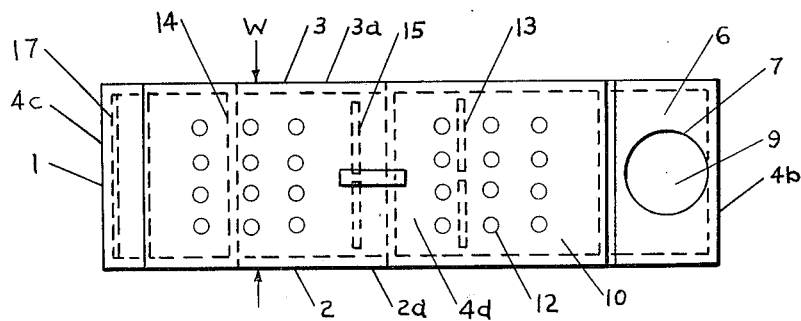
FIGURE 2 is a plan view of FIGURE 1 showing the comparatively narrow width of the washing device.

The washing of fruits and vegetables in the kitchen in actual practice has heretofore been accomplished by the use of a colander, a conventional kitchen pan, or by hand rubbing under an open faucet.

The colander is a bowl shaped sieve with a base. For food washing purposes, the colander is held under an open faucet while containing a pile of food units. The bulk of the water follows the path of least resistance and flows around rather than through the pile of food units. The velocity of the water seeping between the food units is low due to resistance so that liquid scouring and dissolving action is relatively inefficient and slow. Also the food units lie static so that areas of mutual contact and areas of contact with the container receive no washing.

The conventional kitchen pan is generally used for washing by filling the bottom of the pan with food units and most of the remainder with water. The pan is then shaken by hand to simulate the action of a tumbling barrel. The cleaning action is highly erratic and inconsistent. Rinsing is only partial as the liquid is poured out. Bruises and surface damage can be done to berries and delicate skin fruits by the shifting weight of the total load.

The prior art has also provided a two dimensional washing device of the present type. This device is described in my copending application of Serial No. 246,715, filed December 24, 1962. The prior device while providing distinct improvements and advantages is subject to further improvement as disclosed herein.

Referring to the figures, washing device 1 includes side walls 2 and 3 extending longitudinally and vertically and spaced apart in relative proximity. A lateral wall 4 extends between side walls 2 and 3 to provide a bottom wall 4a and two opposite end walls 4b and 4c. The bottom wall 4a and end wall 4b are faired together by radius $R_1$ to provide a curved inner surface, as shown.

The inner surface of end wall 4b extends vertically above point A, which is the point of tangency with radius $R_1$. Point B indicates the lower point of tangency with radius $R_1$. The opposite portion of lateral wall 4 is curved and faired as indicated by radius $R_2$. The internal surface of lateral wall 4 provides a smooth curved perimeter flow path for contained liquid.

Figure 1:
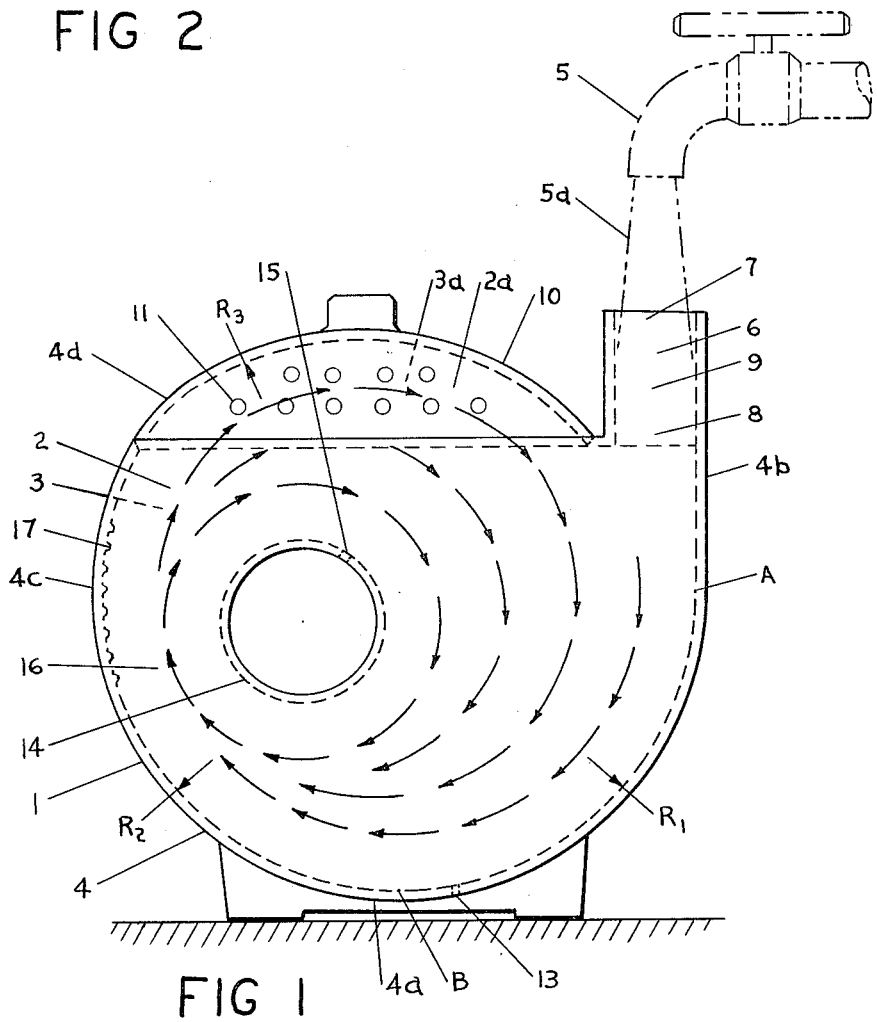
FIGURE 1 is a side view of the fruit and vegetable washing device properly positioned beneath an open water faucet. The arrows indicate the flow path of the circulative liquid flow.

Device 1 is positioned under faucet 5 so that the faucet liquid jet 5a passes through inlet portion 6 and adjacent to end wall 4b. Inlet portion 6 has a circular inlet port 7 at the top, an exit port 8, and a connecting duct 9. The liquid inlet flow enters the container portion of device 1 tangential to the lateral wall at radius $R_1$ which provides a smooth transition to a curved flow path. Radius $R_2$ contributes to effecting a curved circulative flow path. The liquid flow path is indicated by the arrows in FIGURE 1.

Lid closure member 10 includes side walls 2a and 3a extending longitudinally and vertically and spaced apart in relative proximity to cooperate with side walls 2 and 3. Lid closure member 10 also includes lateral wall 4d extending between side walls 2a and 3a. Lateral wall 4d is curved as indicated by radius $R_3$. Lid closure member 10 has a multiplicity of small liquid exhaust apertures 11 in side walls 2a and 3a and a plurality of small exhaust apertures 12 in lateral wall 4d. The bulk of the liquid exhaust flow occurs through apertures 11 and 12. The many small apertures permit the egress of liquid at a low flow rate per unit area of opening while preventing the loss overboard of food units. The lower edge of lid closure member 10 is beveled to engage a corresponding bevel in the upper edge of device 1 to minimize liquid leakage at the joint. Sand and grit is ejected with small auxiliary exhaust liquid jets through apertures 13 in lateral wall 4.

Washing device 1 contains liquid vertically within a width, W of relatively narrow proportions as shown in FIGURE 2. This lateral confinement provides for two dimensional liquid flow in a vertical plane. The circulative flow pattern is induced by the tangential inlet jet and the curved inner surfaces of the lateral wall, FIGURE 1. Two dimensional confinement contributes greatly to liquid flow control and reduces dissipation of kinetic energy from lateral flow and turbulence.

As stated above, the side walls 2 and 3 are in the state of being mutually near. This side wall proximity endows the washing device with a width less than the length or height or each. The device has been found to be operable using conventional household faucets and a reasonable container volume when width W is about one half or less of the length or height of the device. As the width of the device is decreased with respect to the length or height, the efficiency and load capacity increase. When the width of the device is relatively large with respect to the length or height the circulative two dimensional flow pattern is not obtained, but localized random liquid agitation occurs at the region of faucet water entry. This results in erratic and negligble washing action. The specific side wall proximity required for satisfactory performance of any given installation depends upon a number of variables including the liquid mass flow rate, the height and length of the device, the internal contours of the device, the densities and dimensions of the food units to be cleaned, and the size of the wash load.

The kinetic energy of the inlet jet is conserved by the relatively large proportions of radii $R_1$, $R_2$, and $R_3$, and by the substantially two dimensional liquid flow pattern. The overflow liquid is of low velocity and low kinetic energy loss. Viscosity functions to maintain the entire liquid body in a state of circulative flow.

The two dimensional circulative liquid flow in a vertical plane imparts similar circulative motion to contained food units. The submerged food units are buoyed by forces equal to the weights of the displaced liquid. Consequently, only a relatively small amount of liquid drag force is required to lift a given food unit vertically against the gravity force. The drag force of a solid body in non-laminar liquid flow is proportional to the relative velocity squared. Hence, by constructing washing device 1 as described to conserve kinetic energy and to maintain high liquid rotative velocity, the food units are forced to rise and circulate with the liquid. Food unit circulative washing has been achieved using the water jet from conventional household faucets. It was found that the food units experience local tumbling as they move in general circulative flow. This tumbling action adds to the liquid scouring effect and to the cleaning by mutual attrition between food units.

During operation of the washing device, insecticides, fungicides, and other chemicals and soil particles are progressively removed from food units by a continuously diluting liquid flow. The impurities are carried away in the bulk liquid overflow through openings in lid 10. Heavy non-soluble impurities are discharged through auxiliary exhaust ports 13 in lateral wall 4 by small exhausting liquid jets as the impurities are swept along wall 4 by circulative liquid flow. When faucet 5 is closed, drainage occurs automatically through ports 13 permitting food units conveniently to be poured without liquid.

The liquid flow within a washing device of the type described is in the nature of a vortex but with the kinetic energy input occurring at the periphery. The velocity gradient provides decreasing velocities inwardly toward a core portion. The velocities in the core portion are low, and the cleaning action on food units located in the core portion is relatively slow. A purpose of the invention is to eliminate the low velocity core portion of liquid flow by a core-like wall portion 14 in the form of a cylindrical, oval, or similarly shaped core-like wall. The preferred diameter of the core-like wall portion is approximately one-fourth of the length of the washing device for effective elimination of lower velocity liquid flow.

The center of the core-like wall portion 14 is positioned laterally offset from the center of the device. The preferred distance of the center of the core-like wall portion from the faired end wall 4b is approximately two-thirds of the length of the device. This creates a venturi-like throat 16 where the liquid accelerates to increased velocity. This greater liquid velocity increases the liquid drag force on the food units and causes them to rise vertically with increased speed for improved washing action. Also the working capacity of the device is increased since the higher speed flow in venturi-like throat 16 is capable of lifting higher density food units for a given water faucet flow. Similarly throat 16 allows the device to establish circulative food unit motion at lower available water faucet pressure. When food units have obtained higher elevation due to the energetic upward vertical flow through throat 16, gravity forces become additive with the liquid circulative flow forces to contribute to downwardly vigorous circulative action.

Core-like wall portion 14 has auxiliary liquid exhaust openings 15 extending longitudinally. Small liquid jets continuously eject from openings 15 during operation to bleed off the low energy boundary layer of liquid flowing along the surface of wall 14. The streamlines of higher energy liquid flow then move in against wall 14. These streamlines are more stable and resist the formation of local liquid eddies which would dissipate kinetic energy and reduce operating efficiency.

End wall 4c includes rippled surface 17 over a portion thereof. The ridges of the ripples are transverse to the direction of liquid flow. The centrifugal force of the curved flow path forces the food units against rippled surface 17 which provides an abrasive scrub-board like cleaning action on the food units.

While one embodiment of the present invention has been illustrated it is to be understood that what is defined by Letters Patent is specified by the appended claims.

What is claimed is:

1. A washing device comprising two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and a core-like wall portion extending between said side walls and supported with respect thereto, and said core-like wall portion offset laterally from center.

2. A washing device as in claim 1, and the center of said core-like wall portion laterally spaced from said faired end wall a distance of approximately two-thirds of the length of the container portion of said washing device.

3. A washing device as in claim 1, and said core-like wall portion including at least one liquid exhaust opening.

4. A washing device as in claim 1, and a liquid inlet portion, said inlet portion positioned substantially above said region of juncture, and means for supporting said inlet portion with respect to said washing device.

5. A washing device as in claim 1, and an upper closure member, said upper closure member including two side walls extending longitudinally and vertically and spaced apart, and a lateral wall extending between said upper closure member side walls and connecting therewith in unitary relation, and the inner surface of said upper closure member lateral wall substantially curved along the length thereof.

6. A washing device as in claim 1, and an upper closure member, said upper closure member including two side walls extending longitudinally and vertically and spaced apart, and a lateral wall extending between said upper closure member side walls and connecting therewith in unitary relation, and the inner surface of said upper closure member lateral wall substantially curved along the length thereof, and a plurality of small apertures in said upper closure member to provide for liquid exhaust flow.

7. A washing device comprising two side walls extending longitudinally and vertically and spaced apart, a lateral wall extending between said side walls to provide a bottom wall and two opposite end walls and connecting with said side walls in unitary relation, and the inner surface of at least one of said end walls substantially faired to provide a substantially curved inner surface at the region of juncture, and a core-like closure wall extending between said side walls and supported with respect thereto, and said core-like closure wall of generally non-perforated material, and said core-like wall portion offset laterally from center.

8. A washing device comprising two side walls extending longitudinally and vertically and spaced apart, a lateral wall extending between said side walls to provide a bottom wall and two opposite end walls and connecting with said side walls in unitary relation to provide a container portion, and the inner surface of at least one of said end walls substantially faired to provide a substantially curved inner surface at the region of juncture, and a core-like wall portion extending between said side walls and supported with respect thereto, and said core-like wall portion of substantially circular transverse sections, and the horizontal length of said transverse sections not less than approximately one-fourth of the length of said container portion, and said core-like wall portion of generally non-perforated material, and said core-like wall portion offset laterally from center.

References Cited by the Examiner

UNITED STATES PATENTS

| | | | |
|---|---|---|---|
| 97,682 | 12/69 | Nougaret | 68—181 |
| 299,266 | 5/84 | Richardson | 68—233 |
| 747,241 | 12/03 | Schneider | 95—97 |
| 1,245,768 | 11/17 | Randall. | |
| 1,295,470 | 2/19 | Fisher | 134—186 |
| 1,437,713 | 12/22 | Boddy | 68—196 |
| 1,482,049 | 1/24 | Swanson | 220—24 |
| 1,531,274 | 3/25 | Cowden | 220—86 |
| 1,606,965 | 11/26 | Smith | 134—194 |
| 1,659,155 | 2/28 | Peterson | 220—24 |
| 1,748,296 | 2/30 | Lombard | 68—23 |
| 1,771,524 | 7/30 | Brotz | 134—186 |
| 1,775,554 | 9/30 | Dehle | 68—184 |
| 1,839,762 | 1/32 | Johnston | 134—153 X |
| 2,074,100 | 3/37 | Bonish | 134—138 X |
| 2,122,245 | 6/38 | Callahan. | |
| 2,136,571 | 11/38 | Wedler | 68—180 X |
| 2,523,019 | 9/50 | Henderson. | |

FOREIGN PATENTS 587,859    1/59    Italy.

CHARLES A. WILLMUTH, *Primary Examiner.*

GEORGE J. NORTH, *Examiner.*